United States Patent [19]

Kataoka

[11] 4,368,876
[45] Jan. 18, 1983

[54] SELF-PROPELLING BEVEL FUSION-CUTTING MACHINE

[75] Inventor: Hiroshi Kataoka, Takarazuka, Japan

[73] Assignee: Koei Machine Co., Ltd., Osaka, Japan

[21] Appl. No.: 259,059

[22] Filed: Apr. 30, 1981

[51] Int. Cl.$^3$ .............................................. B23K 7/04
[52] U.S. Cl. ...................................... 266/54; 266/56
[58] Field of Search ................................... 266/54, 56

[56] References Cited

U.S. PATENT DOCUMENTS 3,501,872  3/1970  Mighton ............................. 266/56
3,572,669  3/1971  Brand .................................. 266/56

Primary Examiner—W. Stallard
Attorney, Agent, or Firm—Wenderoth, Lind & Ponack

[57] ABSTRACT

A self-propelling bevel fusion-cutting machine for beveling pipes has a machine main body which holds a fusion-cutter, such as a burner, for effecting the bevel fusion-cutting of the end face of a pipe, traveling guide rollers which roll on the pipe end face, and outer roller which rolls circumferentially on the outer peripheral surface of the pipe, and an inner roller which rolls circumferentially on the inner peripheral surface of the pipe. The machine main body is movable along the pipe end face by means of these rollers. The outer or inner roller is removably pressed against the peripheral surface of the pipe and this roller or the other roller is connected to a drive source mounted on the machine main body so as to be thereby driven for rotation. This rotatably driven roller has a substantial width and the diameter of its portion located nearer to the pipe end face is greater than that of its portion located remote therefrom.

1 Claim, 4 Drawing Figures

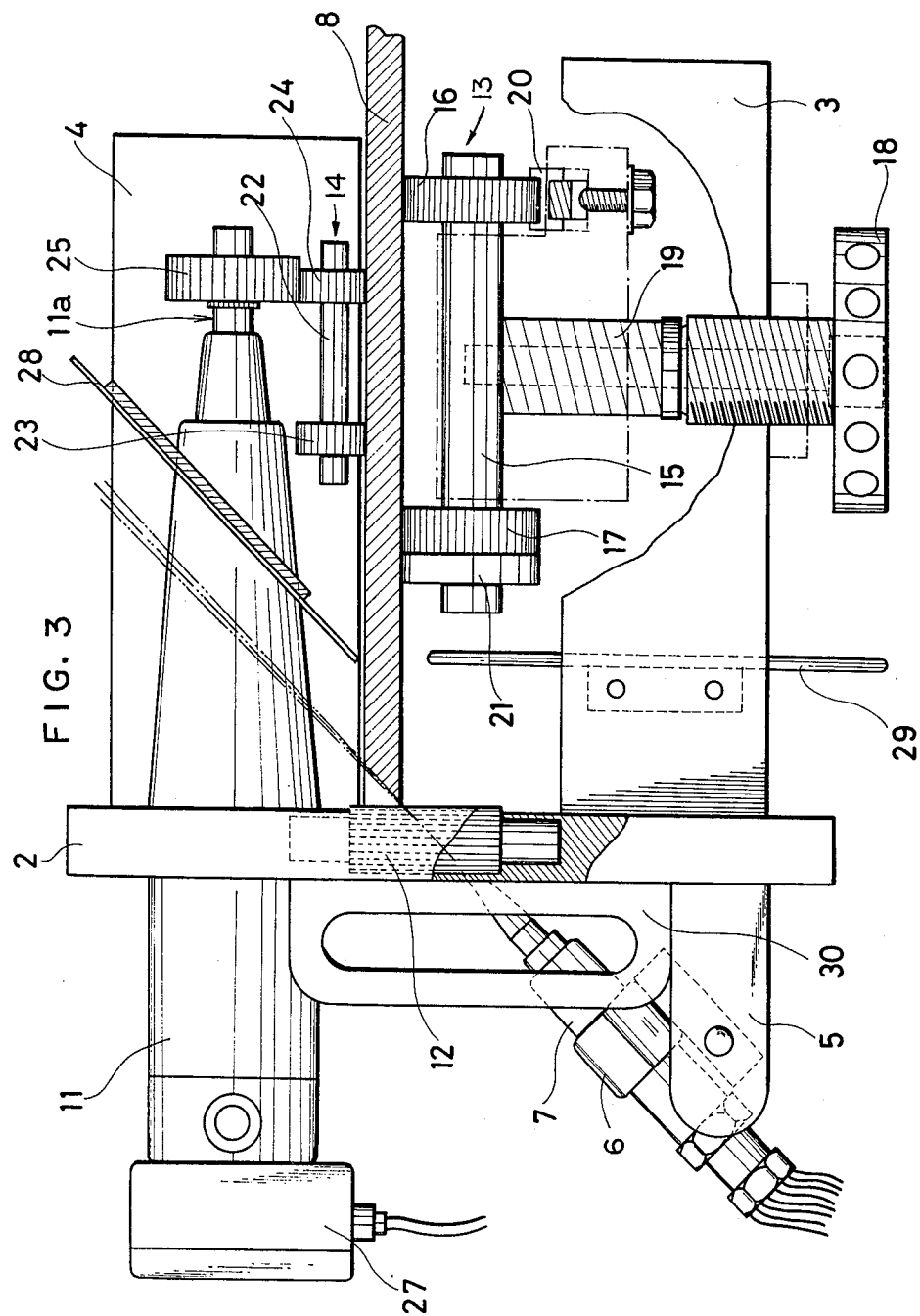

SELF-PROPELLING BEVEL FUSION-CUTTING MACHINE

BACKGROUND OF THE INVENTION

The present invention relates to a self-propelling bevel fusion-cutting machine for beveling pipes by fusion-cutter.

As for edge preparation machines of this type, the so-called rotary edge preparation machine is popular which comprises a base adapted to be fixed in position inside a pipe to be processed, a turntable mounted on said base, and a fusion-cutter such as a burner. However, such conventional edge preparation machine has the following drawbacks.

First, because of the base required besides the fusion-cutter for supporting the latter, the overall weight of the machine correspondingly increases such that machines for large pipes weigh 30 kg and those for small pipes weigh 20 kg, are inconvenient for handling. Particularly, fixedly installing the base inside a pipe takes much time and labor because of its substantial weight. Secondly, whereas pipes to be processed widely vary in diameter, in the case of the rotary edge preparation machine the limited length of the arm which supports the fusion-cutter limits the range of change of the radius of rotation of the fusion-cutter, so that covering the whole range of pipe diameters necessitates providing various sizes of edge preparation machines in accordance with pipe diameters. As a result, the economic burden increases. Thirdly, in cases where the pipe is other than round, e.g., square, the processing of the corners and straight portions requires different radii of rotation of the fusion-cutter. In this case, if the rotative speed of the turntable is constant, the peripheral speed of the fusion-cutter is high relative to the pipe corners and low relative to the straight portions, which means that the straight portions can be fusion-cut but the corners cannot. In order to avoid such situation, special measures must be taken to decrease the rotative speed of the fusion-cutter when its radius of rotation increases, thus making the machine complicated in arrangement and, moreover, adding to the weight. Fourthly, with a round pipe, if the center of rotation of the turntable is placed at the center of pipe, the direction of the flame emitted from the fusion-cutter is maintained at a constant angle with the tangential direction of the pipe periphery. With an other than round, e.g., square pipe, however, it often happens that the direction of the flame is not at a constant angle with the tangential direction of the pipe periphery. As a result, it is difficult to attain a uniform quality of fusion-cut.

SUMMARY OF THE INVENTION

The invention provides an improved self-propelling bevel fusion-cutting machine which eliminates all these drawbacks of the conventional edge preparation machine and which is light in weight, applicable to all sizes of pipes and capable of uniform bevel fusion-cutting throughout the end face of a pipe whose cross-sectional shape is round or otherwise, e.g., square.

A self-propelling bevel fusion-cutting machine according to the invention is characterized by comprising a machine main body which holds a fusion-cutter for effecting the bevel fusion-cutting of the end face of a pipe, traveling guide rollers which roll on said pipe end face, an outer roller which rolls circumferentially on the outer peripheral surface of the pipe, and an inner roller which rolls circumferentially on the inner periphery of the pipe, the arrangement being such that the machine main body is movable circumferentially along the pipe end face by means of said rollers, either said outer roller or said inner roller being arranged so that it can be urged against and moved away from the peripheral surface of the pipe, said roller or the other roller being connected to a drive source mounted on said machine main body so as to be thereby driven for rotation, said rotatively driven roller having a substantial width and the diameter of the portion of said roller located nearer to the pipe end surface being greater than that of its portion located remote therefrom.

BRIEF DESCRIPTION OF THE DRAWINGS

FIG. 3 is a side view, partly broken away, of the apparatus shown in FIG. 3; and FIG. 4 is a view showing the principal portions of another embodiment of the invention.

DETAILED DESCRIPTION OF THE PREFERRED EMBODIMENTS

Figure 1:
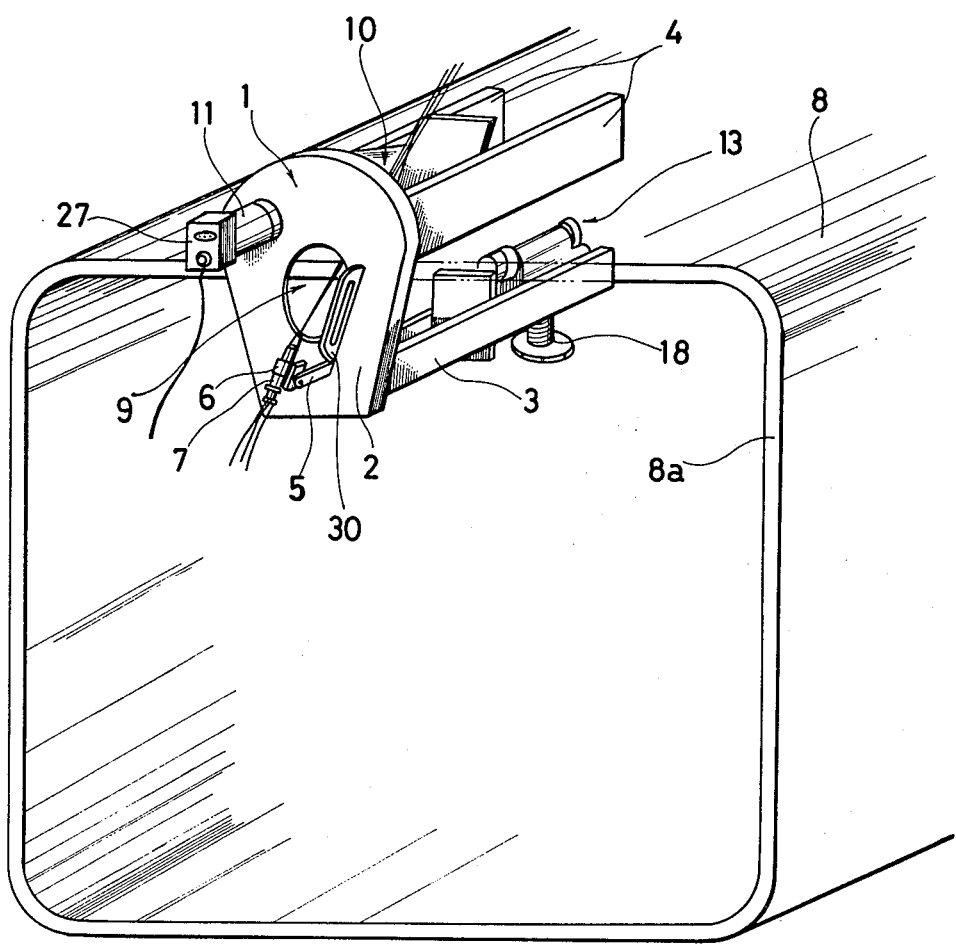
FIG. 1 is a schematic perspective view of an embodiment of the present invention.
Figure 2:
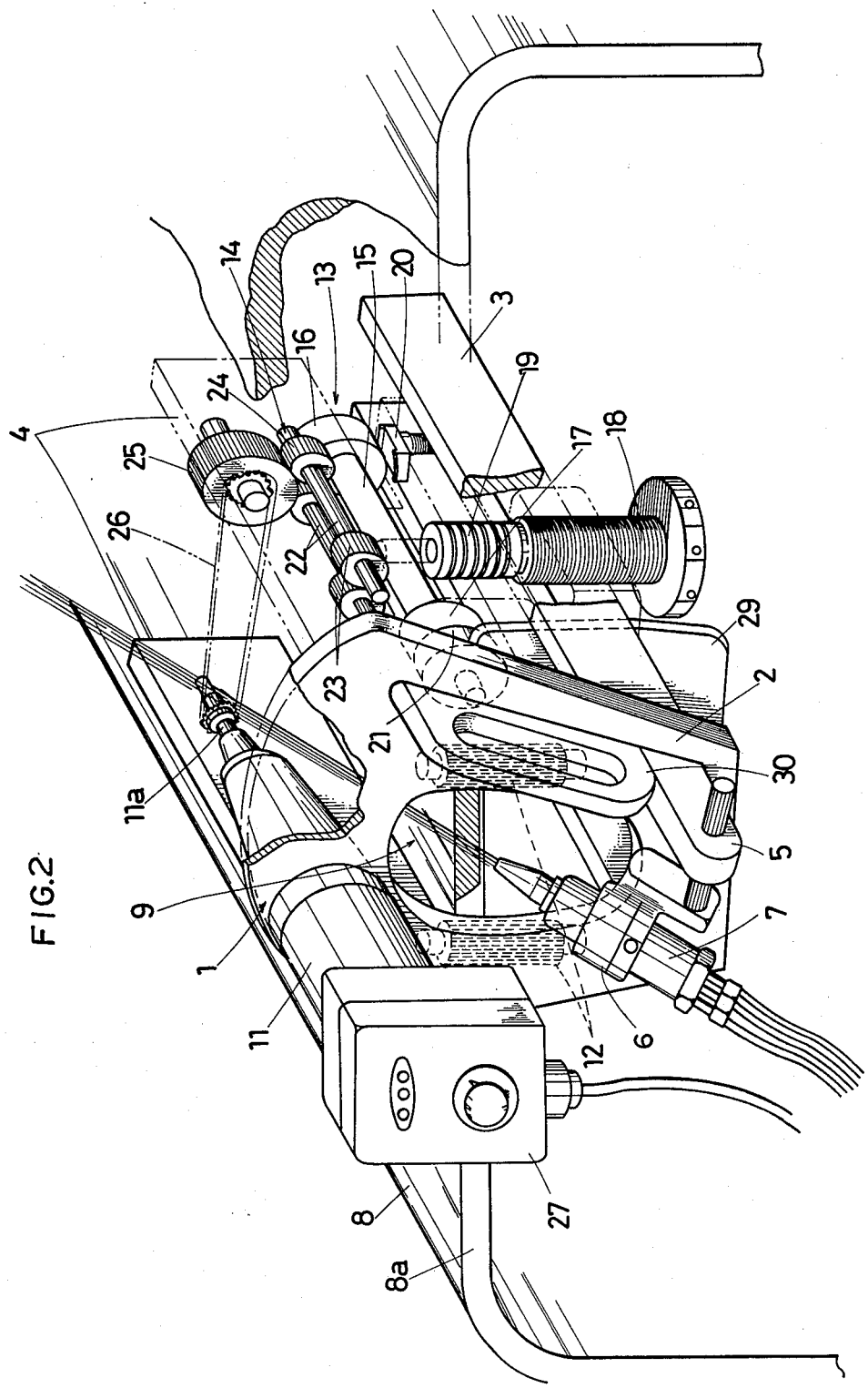
FIG. 2 is a perspective view, partly broken away, showing how the components of the invention are arranged and connected.

A machine main body 1 comprises a base plate 2 formed of an aluminum casting, and a pair of casings 3 and 4 installed on the back of said base plate 2 in opposed relation to each other. The base plate 2 has a fusion-cutter support arm 5 projecting therefrom, said arm 5 supporting a fusion-cutter, e.g., a burner 7 by means of a rotary holder 6. The burner 7 is held in an inclined position to effect the so-called bevel fusion-cutting of the end face 8a of a pipe 8. The base plate 2 located forwardly of the burner 7 is formed with an opening 9, while the casing 4 is formed with an opening 10 for the flame to pass therethrough. Mounted on the base plate 2 is a DC motor 11 serving as a drive source for rotating a roller to be later described.

A pair of traveling guide rollers 12 which roll on the end face 8a of the pipe 8 are supported on said base plate 2 around the opening 9 therein. One casing 3 is provided with an inner roller 13 which rolls circumferentially on the inner peripheral surface of the pipe, while the other casing 4 is provided with an outer roller 14 which rolls circumferentially on the outer peripheral surface of the pipe. By means of these rollers 12, 13 and 14, the machine main body 1 is capable of moving circumferentially along the pipe end face 8a.

The inner roller 13 comprises ball bearings 16 and 17 supported on opposite ends of a single support shaft 15. The ball bearing may be replaced by simple rotatable rings. The support shaft 15 is slidable toward and away from the inner peripheral surface of the pipe 8 by means of a suitable mechanism. In the illustrated embodiment, a pressure-exerting tool 18 is screwed into the casing 3 to engage the support shaft 15. By turning the pressure-exerting tool to move the support shaft 15 toward and away from the inner periphery of the pipe 8, said ball bearings 16 and 17 can be urged against or moved away from the inner peripheral surface of the pipe 8 so as to apply pressure to the ball bearings or remove pressure therefrom. The removal of pressure is effected only when the machine main body 1 is attached to or detached from the pipe 8, and in normal operating condition, the ball bearings are maintained under pressure. The pressure-exerting tool 18 has a safety spring 19 fitted thereon. Of the bearings, the one 16 located remote from the end face 8a of the pipe is provided with a travel-direction control brake 20. The bearing 17 located nearer to the pipe end face 8a has a disc 21 fastened to the lateral surface thereof for protecting against flames.

The outer roller 14 comprises a pair of gears 23 and 24 fixed on opposite sides of a rotary shaft 22. Of the two gears, the one 23 located nearer to the pipe end face 8a is greater in diameter than the other gear 24. The gear 24 located remote from the pipe end surface 8a meshes with a drive gear 25. The drive gear 25 is supported on a shaft by the casing 4 and connected to the rotary shaft 11a of a DC motor 11 through a chain 26. Therefore, the outer roller, i.e., the pair of gears 23 and 24 are driven by the DC motor 11. The means for transmitting power from the drive source to the gears 23 and 24 is not limited to the illustrated chain transmission and may be gears alone. Further, the number of gears constituting the outer roller 14 and their positions may be suitably changed.

In the drawings, 27 denotes an operating box for controlling the speed and rotative direction of said DC motor 11; 28 denotes a protective plate for protecting the outer roller 14 against the flame of the burner 7; and 29 denotes a protective plate for protecting the inner roller 14 against the flame, both protective plates being each formed of a stainless steel plate and an asbestos plate. The numeral 30 denotes a handle used to attach the machine main body 1 to the pipe 8 or detach it from the latter.

In operation, the pressure-exerting tool 18 is manipulated to press the inner roller 13 against the inner peripheral surface of the pipe 8 and then the DC motor 11 is energized, whereupon with the rotation of the outer roller 14, the machine main body 1 starts moving circumferentially along the end face 8a of the pipe. The rate of movement of the machine main body is proportional to the rotative speed of the outer roller 14, i.e., the rotative speed of the DC motor 11. If, therefore, the rotative speed of the DC motor is constant, the rate of movement of the machine main body 1 is maintained constant at any position on the pipe end face 8a regardless of the shape of the pipe 8.

The outer roller 14 driven by the DC motor 11 is composed of a pair of gears 23 and 24 and since the gear 23 located nearer to the pipe end face 8a is greater in diameter than the gear 24 on the far side, the peripheral speed of the gear 23 located nearer to the pipe end face is greater than that of the other gear 24, with the result that the traveling guide rollers 12 are held in intimate contact with the pipe end face 8a. As a result, the machine main body 1 moves at a constant speed along the end face 8a of the pipe, with the traveling guide rollers 12 contacted with the pipe end face 8a. Because the machine main body 1 is of the self-propelling type moving along the pipe end face, the direction of the flame emitted from the burner 7 is at right angles to the tangential direction of the peripheral surface of the pipe at any position on the pipe end face. Therefore, satisfactory bevel fusion-cutting of the pipe end face 8a can be effected uniformly throughout the circumference thereof by the flame from the burner 7.

In addition, in the above embodiment, the outer roller 14 has been described as composed of the larger-diameter gear 23 located nearer to the pipe end face and the smaller-diameter gear 24 located remote from the pipe end face, but it is not limited to such arrangement, provided that the rotation of the roller 14 causes the machine main body 1 to move along the pipe end face 8a while holding the traveling guide rollers 1 in intimate contact with the pipe end face 8a. Thus, it is only necessary that it have a substantial width and that the diameter of its portion located nearer to the pipe end face is greater than that of its portion located on the far side. Therefore, it may be in the form, e.g., of a single conical roller, as shown in FIG. 4. The number of gears and their arrangement are not limited. The gears may be equipped with a tire. Further, the embodiment has been so arranged that the outer roller 14 is driven by the drive source 11, but of course it goes without saying that the inner roller 13 may be driven for rotation. In that case, the inner roller 13 may be arranged as in the outer roller 14 of the above embodiment or may be in the form of a conical roller as shown in FIG. 4. Further, the pressure-exerting tool 18 may be so arranged as to be pressed against and separated from the peripheral surface of the outer roller 14 rather than the inner roller 13.

The self-propelling bevel fusion-cutting machine arranged in the manner described above according to the invention has the following merits.

(1) There is no need for separately providing a turntable as in the conventional rotary bevel fusion-cutting machine, so that the present machine is light in weight and easy handle.

(2) Since the machine is of the self-propelling type adapted to move along the end face of a pipe, it is very versatile, being applicable to all types of pipes irrespective of their thickness.

(3) Since the rate of movement of the machine main body can be maintained constant at any position on the pipe end face irrespective of the pipe shape by maintaining the rotative speed of the drive source constant, the machine is capable of uniform bevel fusion-cutting without leaving any portion uncut even if the pipe is other than round.

(4) Since the angle of the flame emitted from the fusion-cutter is constant with respect to the entire end face of the pipe, uniform bevel fusion-cutting can be effected, thus ensuring a constant bevel angle throughout the pipe end face.

What is claimed is:

1. A self-propelling bevel fusion-cutting machine comprising a machine main body which holds a fusion-cutter for effecting the bevel fusion-cutting of the end face of a pipe, traveling guide rollers which roll on said pipe end face, an outer roller which rolls circumferentially on the inner peripheral surface of the pipe, and an inner roller which rolls circumferentially on the outer peripheral surface of the pipe, the arrangement being such that the machine main body is movable circumferentially along the pipe end face by means of said rollers, either said outer roller or said inner roller being arranged so that it can be urged against and moved away from the peripheral surface of the pipe, one of said rollers being connected to a drive source mounted on said machine main body so as to be thereby driven for rotation, said rotatably driven roller having a substantial width and the diameter of the portion of said roller located nearer to the pipe end face being greater than that of its portion located remote therefrom.

* * * * *

UNITED STATES PATENT AND TRADEMARK OFFICE
CERTIFICATE OF CORRECTION

PATENT NO. : 4,368,876
DATED : January 18, 1983
INVENTOR(S) : Hiroshi Kataoka

It is certified that error appears in the above—identified patent and that said Letters Patent is hereby corrected as shown below:

Column 2, line 22, change "Fig. 3" to --Fig. 1--;

Column 3, line 29, change "14" to --13--;

Column 4, line 5,  change "1" to --12--;
         line 54, change "inner" to --outer--;
         line 55, change "outer" to --inner--;

In the Abstract, the right column, line 4, change "and"
         to --an--.

Signed and Sealed this

Sixteenth Day of October 1984

[SEAL]

Attest:

Attesting Officer

GERALD J. MOSSINGHOFF

Commissioner of Patents and Trademarks